US012120715B2

(12) United States Patent
Je et al.

(10) Patent No.: US 12,120,715 B2
(45) Date of Patent: Oct. 15, 2024

(54) METHOD OF TRANSMITTING AND RECEIVING USER EQUIPMENT MANAGEMENT INFORMATION IN WIRELESS COMMUNICATION SYSTEM AND ELECTRONIC DEVICE FOR PERFORMING THE METHOD

(71) Applicant: SAMSUNG ELECTRONICS CO., LTD., Suwon-si (KR)

(72) Inventors: Huiwon Je, Suwon-si (KR); Jeonghun Kim, Hwaseong-si (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/317,516

(22) Filed: May 15, 2023

(65) Prior Publication Data

US 2023/0284248 A1 Sep. 7, 2023

Related U.S. Application Data

(63) Continuation of application No. 16/791,271, filed on Feb. 14, 2020, now Pat. No. 11,653,370.

(30) Foreign Application Priority Data

Feb. 22, 2019 (KR) ........................ 10-2019-0021297
Jul. 3, 2019 (KR) ........................ 10-2019-0080315

(51) Int. Cl.
*H04W 72/53* (2023.01)
*H01Q 3/26* (2006.01)
(Continued)

(52) U.S. Cl.
CPC .......... *H04W 72/53* (2023.01); *H01Q 3/2605* (2013.01); *H04W 72/0453* (2013.01); *H04W 72/23* (2023.01); *H04W 76/27* (2018.02)

(58) Field of Classification Search
None
See application file for complete search history.

(56) References Cited

U.S. PATENT DOCUMENTS 9,031,589 B2 5/2015 Goto et al.
9,537,587 B2 1/2017 Chai et al.
(Continued)

FOREIGN PATENT DOCUMENTS

CN 102792720 A 11/2012
EP 2 712 224 A1 3/2014
(Continued)

OTHER PUBLICATIONS

Communication dated Sep. 7, 2023, issued by the China National Intellectual Property Administration in counterpart Chinese Application No. 202010106421.8.
(Continued)

*Primary Examiner* — Srinivasa R Reddivalam
(74) *Attorney, Agent, or Firm* — Sughrue Mion, PLLC

(57) ABSTRACT

There is provided a method of transmitting and receiving user equipment management information and electronic device for performing the same. The electronic device includes a communication interface including a plurality of phase array antennas, a storage configured to store user equipment (UE) management information including information about at least one frequency band covered by each of the phase array antennas, and a controller configured to control to transmit the UE management information to a base station.

17 Claims, 13 Drawing Sheets

(51) Int. Cl.

| | |
|---|---|
| ***H04W 72/0453*** | (2023.01) |
| ***H04W 72/23*** | (2023.01) |
| ***H04W 76/27*** | (2018.01) |

(56) References Cited

U.S. PATENT DOCUMENTS

| | | | | |
|---|---|---|---|---|
| 9,635,642 | B2 | 4/2017 | Lee et al. | |
| 9,806,926 | B2 | 10/2017 | Xu et al. | |
| 10,299,111 | B2 | 5/2019 | Wu et al. | |
| 10,631,159 | B2 | 4/2020 | Chakraborty et al. | |
| 10,972,241 | B2 | 4/2021 | Choi et al. | |
| 2012/0282922 | A1 | 11/2012 | Fodor et al. | |
| 2013/0265964 | A1 | 10/2013 | Yokomakura et al. | |
| 2016/0119857 | A1* | 4/2016 | Mohan | H04W 48/00 455/434 |
| 2016/0211898 | A1* | 7/2016 | Cai | H04B 7/0617 |
| 2016/0226640 | A1 | 8/2016 | Seol et al. | |
| 2017/0353955 | A1* | 12/2017 | Hsu | H04W 72/0453 |
| 2018/0063693 | A1 | 3/2018 | Chakraborty et al. | |
| 2018/0198497 | A1 | 7/2018 | Wei et al. | |
| 2018/0269946 | A1 | 9/2018 | Choi et al. | |
| 2018/0278395 | A1 | 9/2018 | Yoon | |
| 2018/0287680 | A1 | 10/2018 | Xu et al. | |
| 2019/0239092 | A1* | 8/2019 | Zhou | H04W 16/28 |
| 2019/0253112 | A1 | 8/2019 | Raghavan et al. | |
| 2019/0372734 | A1* | 12/2019 | Choi | H04B 7/0628 |
| 2020/0014433 | A1* | 1/2020 | Bengtsson | H04W 72/0453 |
| 2020/0145072 | A1 | 5/2020 | Dash et al. | |
| 2020/0266870 | A1* | 8/2020 | Yoon | H04B 17/318 |
| 2020/0396627 | A1* | 12/2020 | Hwang | H04W 24/08 |
| 2021/0176789 | A1 | 6/2021 | Takahashi et al. | |
| 2021/0367657 | A1* | 11/2021 | Chen | H04L 5/0023 |

FOREIGN PATENT DOCUMENTS

| | | | |
|---|---|---|---|
| WO | 2016/029485 | A1 | 3/2016 |
| WO | 2018/151554 | A1 | 8/2018 |
| WO | 2020/164339 | A1 | 8/2020 |

OTHER PUBLICATIONS

Qualcomm Incorporated, "SRS antenna switching UE capabilities," 3GPP TSG-RAN WG2 #103 meeting, R2-1811133, Aug. 2018, Total 6 pages.

Communication dated Oct. 15, 2020 issued by the Intellectual Property Office of Great Britain in application No. GB2002486.5.

Communication dated Jan. 27, 2022 issued by the Great Britain Intellectual Property Office in counterpart Great Britain Application No. GB2002486.5.

* cited by examiner

METHOD OF TRANSMITTING AND RECEIVING USER EQUIPMENT MANAGEMENT INFORMATION IN WIRELESS COMMUNICATION SYSTEM AND ELECTRONIC DEVICE FOR PERFORMING THE METHOD

CROSS-REFERENCE TO THE RELATED APPLICATIONS

This is a Continuation of U.S. application Ser. No. 16/791,271 filed Feb. 14, 2020, which is based on and claims priority from Korean Patent Application Nos. 10-2019-0021297 and 10-2019-0080315, respectively filed on Feb. 22, 2019 and Jul. 3, 2019, in the Korean Intellectual Property Office, the disclosures of which are incorporated herein in their entirety by reference.

BACKGROUND

Apparatus and methods consistent with exemplary embodiment of the inventive concept relate to wireless communication, and more particularly, to transmitting and receiving user equipment (UE) management information in a wireless communication system.

An effort for developing an improved 5th generation (5G) communication system or a pre-5G communication system is being made for satisfying the demand, which is increasing after a 4th generation (4G) communication system is commercialized, for wireless data traffic. For this reason, the 5G communication system or the pre-5G communication system is referred to as a new radio (NR) system according to the $3^{rd}$ generation partnership project (3GPP) standard.

In order to realize a high data transmission rate, the 5G communication system is being considered to be implemented in a millimeter wave band (for example, a band of 28 GHz, a band of 39 GHz, etc.). In the 5G communication system, beamforming, massive multiple input multiple output (MIMO), full dimensional MIMO (FD-MIMO), array antenna, analog beamforming, hybrid beamforming, and large scale antenna technologies are being considered for increasing a radio wave transfer distance and reducing the loss of a radio wave path in the microwave band.

SUMMARY

Various embodiments of the inventive concept provides a wireless communication system which provides a base station with frequency band information covered by each of a plurality of phase array antennas, thereby efficiently allocating resources.

According to an aspect of an embodiment, there is provided an electronic device including: a communication interface including a plurality of phase array antennas; a storage configured to store user equipment (UE) management information including information about at least one frequency band covered by each of the phase array antennas; and a controller configured to control to transmit the UE management information to a base station.

According to another aspect of the inventive concept, there is provided an operating method of an electronic device including a plurality of phase array antennas, the operating method including: storing UE management information including information about at least one frequency band covered by each of the phase array antennas; and transmitting the UE management information to a base station.

According to another aspect of the inventive concept, there is provided a base station including: a communication interface configured to receive UE management information from an electronic device including a plurality phrase array antennas; and a controller configured to perform resource allocation on the basis of the received UE management information.

According to another aspect of the inventive concept, there is provided a wireless communication system including: the above electronic device; and a base station configured to perform resource allocation on the electronic device on the basis of the UE management information, wherein the UE management information includes information about at least one frequency band covered by each of the plurality of phase array antennas.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The embodiments described herebelow are all exemplary, and thus, the inventive concept is not limited to these embodiments disclosed below, and may be realized in various other forms. An embodiment provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

Figure 1:
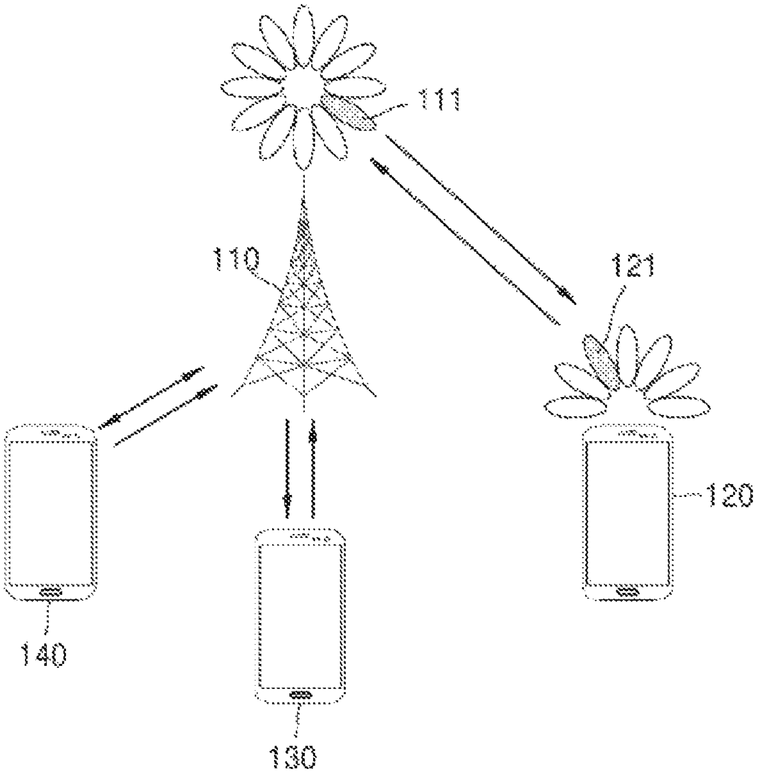
FIG. 1 is a diagram illustrating a wireless communication system according to an embodiment.

FIG. 1 is a diagram illustrating a wireless communication system according to an embodiment.

Referring to FIG. 1, a base station 110 and an electronic device 120 may be provided. The base station 110 and the electronic device 120 may be provided as nodes using a wireless channel in the wireless communication system.

The base station 110 may be a network infrastructure for providing wireless access to the electronic device 120. The base station 110 may have coverage which is defined as a certain geographical region on the basis of a distance enabling transmission of a signal. The base station 110 may be referred to as an access point (AP), an eNodeB (eNB), a 5th generation (5G) node, or a wireless point, or may be replaced by other terms having a same or similar technical meaning.

According to various embodiments, the base station 110 may be connected to one or more transmission/reception points (TRPs). The base station 110 may transmit a downlink signal to the electronic device 120 or may receive an uplink signal from the electronic device 120 through the one or more TRPs.

The electronic device 120 may be a device used by a user, and may perform communication with the base station 110 through a wireless channel. The electronic device 120 may be referred to as user equipment (UE), a mobile station, a subscriber station, a customer premises equipment (CPE), a remote terminal, a wireless terminal, or a user device, in addition to a terminal, or may be replaced by other terms having a same or similar technical meaning.

The base station 110 and the electronic device 120 may transmit and receive a wireless signal at a millimeter wave band (for example, 28 GHz, 30 GHz, 38 GHz, 60 GHz, etc.). In order to overcome a high attenuation characteristic of a millimeter wave, the base station 110 and the electronic device 120 may perform beamforming. Here, the beamforming may include transmission beamforming and reception beamforming. That is, the base station 110 and the electronic device 120 may assign directivity to a transmission signal or a reception signal. To this end, the base station 110 and the electronic device 120 may perform beam search, beam training, and beam management to select an optimal beam for wireless communication.

According to the above-described embodiment, it is described that the base station 110 transmits or receives a wireless signal to or from the electronic device 120, but the present embodiment is not limited thereto. According to various embodiments, the base station 110 may independently transmit or receive a wireless signal to or from other electronic devices 130 and 140 as well as the electronic device 120. For example, the base station 110 may perform beam search along with each of the electronic devices 120, 130, and 140 to select an optimal beam for each of the electronic devices 120, 130, and 140 from among a plurality beams, and may independently perform wireless communication.

Figure 2:
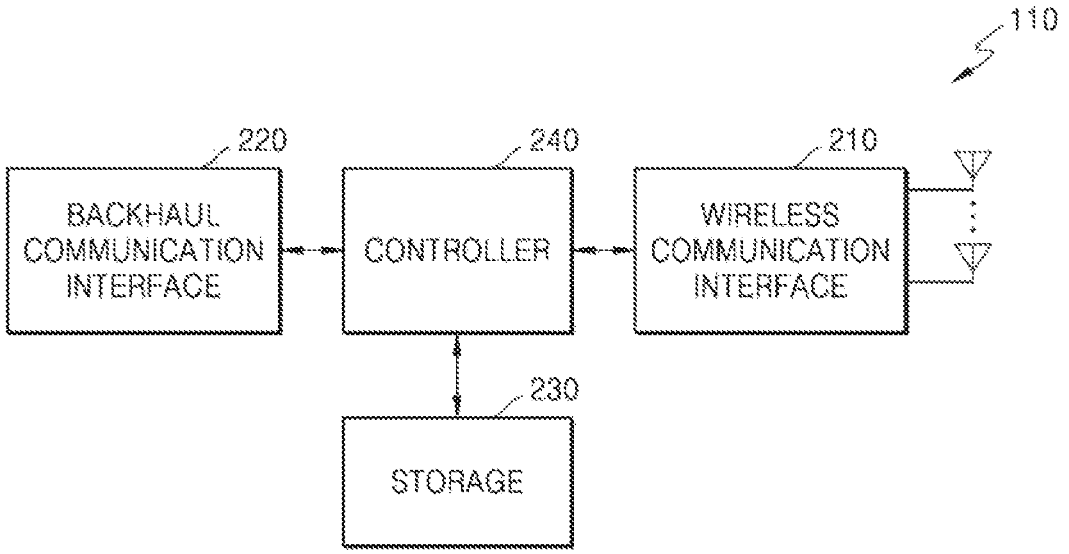
FIG. 2 is a block diagram of a base station according to an embodiment.

FIG. 2 is a block diagram of a base station 110 according to an embodiment.

Referring to FIG. 2, the base station 110 may include a wireless communication interface 210, a backhaul communication interface 220, a storage 230, and a controller 240.

The wireless communication interface 210 may perform functions for transmitting and receiving a signal through a wireless channel. According to an embodiment, the wireless communication interface 210 may perform a conversion function between a baseband signal and a bit string according to physical layer specification for a system. For example, in transmitting data, the wireless communication interface 210 may encode and modulate a transmission bit string to generate complex symbols, and in receiving data, the wireless communication interface 210 may demodulate and decode a baseband signal to restore a reception bit string. Moreover, the wireless communication interface 210 may up-convert the baseband signal into a radio frequency (RF) band signal, and may transmit the RF band signal through an antenna, or may down-convert an RF band signal, received through the antenna, into a baseband signal. To this end, the wireless communication interface 210 may include a transmission filter, a reception filter, an amplifier, a mixer, an oscillator, a digital-to-analog converter (DAC), an analog-to-digital converter (ADC), and/or the like.

The wireless communication interface 210 may transmit or receive a signal. For example, the wireless communication interface 210 may transmit a synchronization signal, a reference signal, system information, messages, control information, data, or the like. Also, the wireless communication interface 210 may perform beamforming. The wireless communication interface 210 may apply a beamforming weight to a signal which is to be transmitted, for assigning directivity to the signal. The wireless communication interface 210 may process a generated beam to repeatedly transmit a signal.

The backhaul communication interface 220 may provide an interface for performing communication with other nodes of a network. That is, the backhaul communication interface 220 may convert a bit string, transmitted from the base station 110 to another node (for example, another access node, another base station, an upper node, a core network, or the like), into a physical signal, and may convert the physical signal, received from the other node, into the bit string.

The storage 230 may store data such as a basic program, an application program, and configuration information for an operation of the base station 110. The storage 230 may be configured with a volatile memory, a non-volatile memory, or a combination thereof. The controller 240 may control operations of the base station 110. For example, the controller 240 may transmit and receive a signal through the wireless communication interface 210 and/or the backhaul communication interface 220. Also, the controller 240 may record or read data in or from the storage 230. To this end, the controller 240 may include at least one processor or a microprocessor, or may be a portion of a processor.

Figure 3:
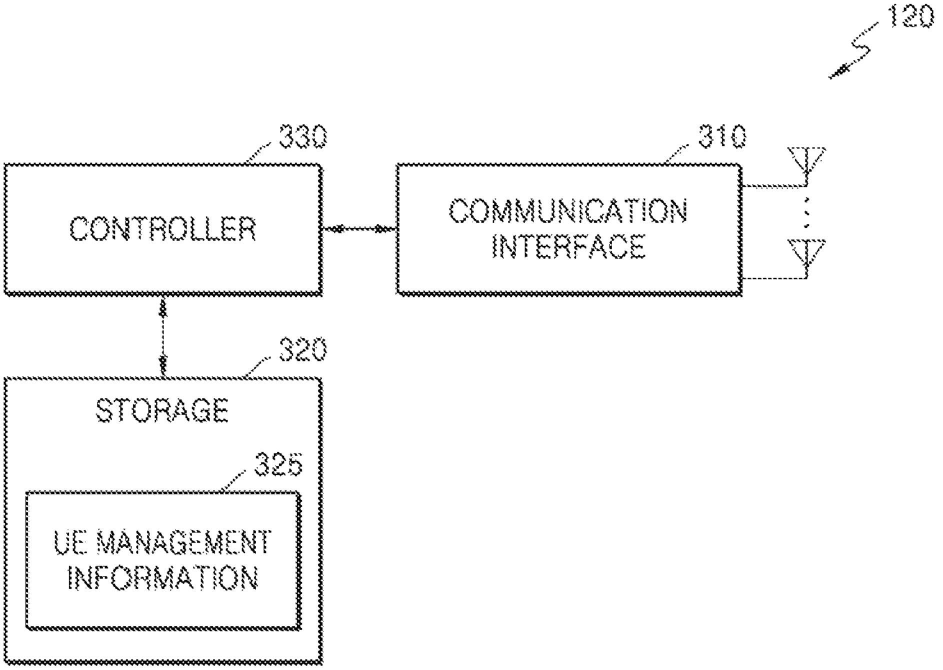
FIG. 3 is a block diagram of an electronic device according to an embodiment.

FIG. 3 is a block diagram of an electronic device 120 according to an embodiment. Description, which is the same as or similar to the description of FIG. 2, is omitted.

Referring to FIG. 3, the electronic device 120 may include a communication interface 310, a storage 320, and a controller 330.

The communication interface 310 may perform functions for transmitting and receiving a signal through a wireless channel. For example, the communication interface 310 may perform a conversion function between a baseband signal and a bit string according to physical layer specification for a system. For example, in transmitting data, the communication interface 310 may encode and modulate a transmission bit string to generate complex symbols, and in receiving data, the communication interface 310 may demodulate and decode a baseband signal to restore a reception bit string. Moreover, the communication interface 310 may up-convert the baseband signal into an RF band signal, and may transmit the RF band signal through an antenna, or may down-convert an RF band signal, received through the antenna, into a baseband signal. For example, the communication interface 310 may include a transmission filter, a reception filter, an amplifier, a mixer, an oscillator, a DAC, an ADC, and/or the like. The communication interface 310 may perform beamforming. The communication interface 310 may apply a beamforming weight to a signal which is to be transmitted, for assigning directivity to the signal.

The communication interface 310 may transmit or receive a signal. The communication interface 310 may receive a downlink signal. The downlink signal may include a synchronization signal (SS), a reference signal (RS), system information, a configuration message, control information, data, downlink data, or the like. Also, the communication interface 310 may transmit an uplink signal. The uplink signal may include a random access-related signal, a reference signal (for example, a sounding reference signal (SRS), or a DM-RS (demodulation reference signal)), or uplink data.

The storage 320 may store data such as a basic program, an application program, and configuration information for an operation of the electronic device 120 under control of the controller 330 connected thereto. The storage 320 may be configured with a volatile memory, a non-volatile memory, or a combination thereof. Also, the storage 320 may provide the stored data on the basis of a request of the controller 330.

According to various embodiments, the storage 320 may include UE management information. The UE management information includes information about a plurality of phase array antennas of the electronic device 120. For example, the UE management information may include information about frequency bands covered or receivable by each of the plurality of phase array antennas. In other words, the UE management information may include information about frequency bands through which each of the plurality phase array antennas is able to receive a wireless signal. Herein, the terms "covered" and "receivable" may be interchangeably used. As another example, the UE management information may include information about a plurality phase array antennas corresponding to each of frequency bands.

The controller 330 may control operations of the electronic device 120. For example, the controller 330 may transmit and receive a signal through the communication interface 310. Also, the controller 330 may record or read data in or from the storage 320. To this end, the controller 330 may include at least one processor or a microprocessor, or may be a portion of a processor. When the controller 330 is a portion of a processor, a portion of the communication interface 310 and the controller 330 may be referred to as a communication processor (CP).

Figure 4A:
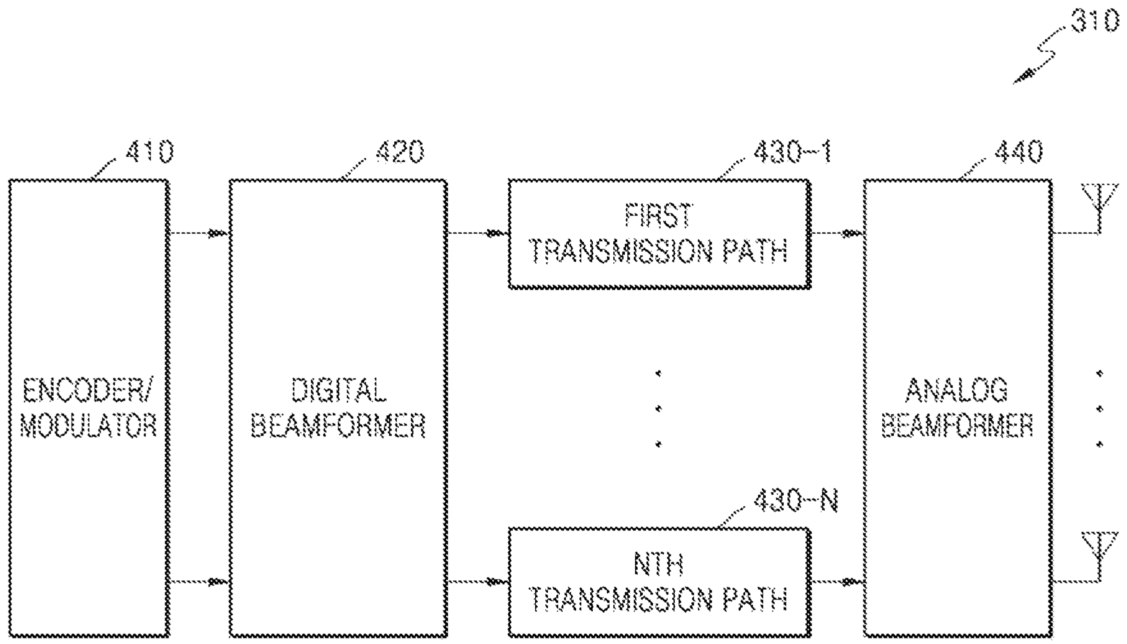
FIG. 4A is a block diagram of a communication interface in a case of transmitting a wireless signal, according to example embodiments.
Figure 4B:
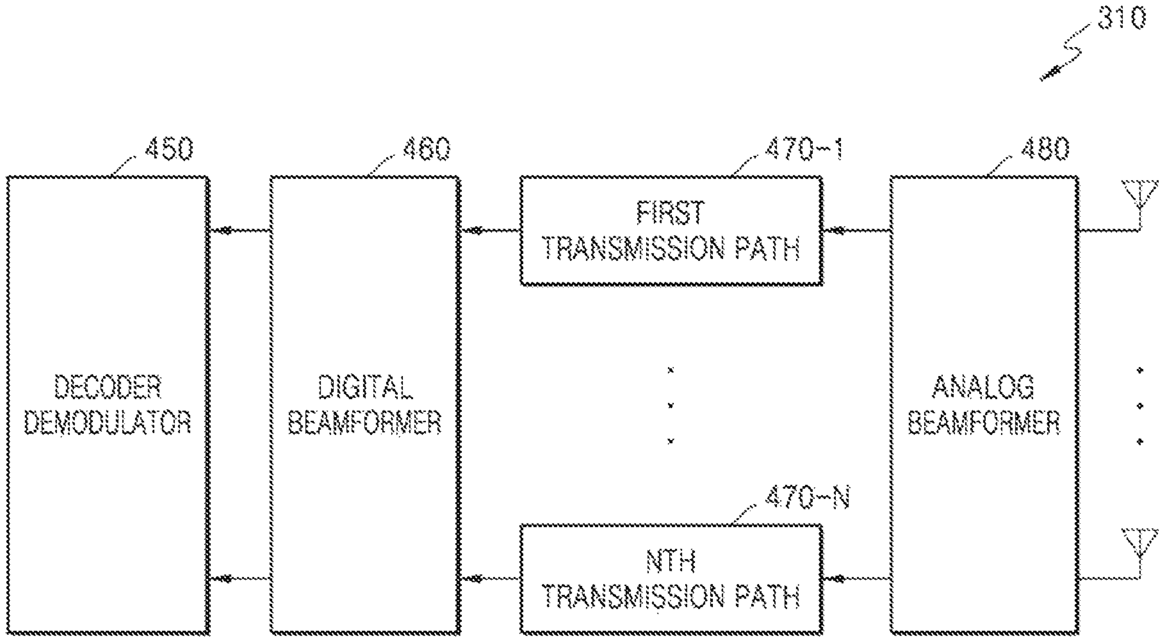
FIG. 4B is a block diagram of a communication interface in a case of receiving a wireless signal, according to an embodiment.

FIG. 4A is a block diagram of a communication interface in a case of transmitting a wireless signal, according to an embodiment, and FIG. 4B is a block diagram of a communication interface in a case of receiving a wireless signal, according to an embodiment.

FIG. 4A illustrates an example of a detailed configuration of the communication interface 310 of FIG. 3. In detail, FIG. 4A illustrates elements for performing hybrid beamforming in a case of transmitting a wireless signal.

Referring to FIG. 4A, the communication interface 310 may include an encoder/modulator 410, a digital beamformer 420, first to $N^{th}$ transmission paths 430-1 to 430-N, and an analog beamformer 440. N is an integer greater than 1.

The encoder/modulator 410 may perform channel encoding. The channel encoding may use at least one of a low density parity check (LDPC) code, a convolution code, a polar code, and a turbo code, not being limited thereto. The encoder/modulator 410 may perform constellation mapping to generate modulation symbols.

The digital beamformer 420 may perform beamforming on a digital signal (for example, the modulation symbols). To this end, the digital beamformer 420 may multiply the modulation symbols by beamforming weights. Here, the beamforming weights may be used for changing a magnitude (or level) and a phase of a signal, and may be referred to as a precoding matrix or a precoder. The digital beamformer 420 may output digital beamforming-performed modulation symbols to the first to $N^{th}$ transmission paths 430-1 to 430-N. In this case, based on a multiple input multiple output (MIMO) transmission technique, the modulation symbols may be multiplexed, or the same modulation symbols may be provided to the first to $N^{th}$ transmission paths 430-1 to 430-N.

The first to $N^{th}$ transmission paths 430-1 to 430-N may convert digital beamforming-performed digital signals into analog signals. To this end, each of the first to $N^{th}$ transmission paths 430-1 to 430-N may include an inverse fast Fourier transform (IFFT) calculator, a cyclic prefix (CP) inserter, a DAC, and an up-converter. The CP inserter may be for orthogonal frequency division multiplexing (OFDM), and a case where another physical layer scheme (for example, a filter bank multi-carrier (FBMC)) is applied may be excluded. That is, the first to $N^{th}$ transmission paths 430-1 to 430-N may provide an independent signal processing process on a plurality of streams generated through digital beamforming. However, based on an implementation type, some of the first to $N^{th}$ transmission paths 430-1 to 430-N may be used in common.

The analog beamformer 440 may perform beamforming on an analog signal. To this end, the analog beamformer 440 may multiply analog signals by beamforming weights. Here, the beamforming weights may be used for changing a magnitude and a phase of a signal.

FIG. 4B illustrates an example of a detailed configuration of the communication interface 310 of FIG. 3. In detail, FIG. 4B illustrates elements for performing hybrid beamforming in a case of receiving a wireless signal.

According to various embodiments, the communication interface 310 may include a decoder/demodulator 450, a digital beamformer 460, first to $N^{th}$ reception paths 470-1 to 470-N, and an analog beamformer 480. N is an integer greater than 1.

The decoder/demodulator 450 may perform channel decoding. The channel decoding may use at least one of an LDPC code, a convolution code, a polar code, and a turbo code, not being limited thereto.

According to various embodiments, the digital beamformer 460 and the analog beamformer 480 may respectively correspond to the digital beamformer 420 and the analog beamformer 440 of FIG. 4A.

The first to $N^{th}$ reception paths 470-1 to 470-N may convert analog beamforming-performed analog signals into digital signals. To this end, each of the first to $N^{th}$ reception paths 470-1 to 470-N may include a fast Fourier transform (FFT) calculator, an ADC, a CP remover, a serial-to-parallel converter, and a down-converter. In detail, each of the first to $N^{th}$ reception paths 470-1 to 470-N may down-convert a received signal into a baseband frequency, remove a CP to generate a serial time domain baseband signal, convert the serial time domain baseband signal into parallel time domain signals, execute an FFT algorithm to generate N parallel frequency domain signals, and convert the parallel frequency domain signals into a sequence of modulated data symbols. That is, the first to $N^{th}$ reception paths 470-1 to 470-N may provide an independent signal processing process on a plurality of streams generated through analog beamforming. However, based on an implementation type, some of the first to $N^{th}$ reception paths 470-1 to 470-N may be used in common.

Although FIGS. 4A and 4B and the above descriptions explain the communication interface 310 has different components or elements for transmitting a wireless signal and receiving a wireless signal, one same component or element may preform both functions. That is, the encoder/modulator 410, the digital beamformer 420, the first to $N^{th}$ transmission paths 430-1 to 430-N, and the analog beamformer 440 illustrated in FIG. 4A may be the same components or elements as the decoder/demodulator 450, the digital beamformer 460, the first to $N^{th}$ reception paths 470-1 to 470-N, and the analog beamformer 480, respectively, but may perform different functions depending on whether the wireless communication interface transmits or receives a wireless signal as described above.

Figure 5A:
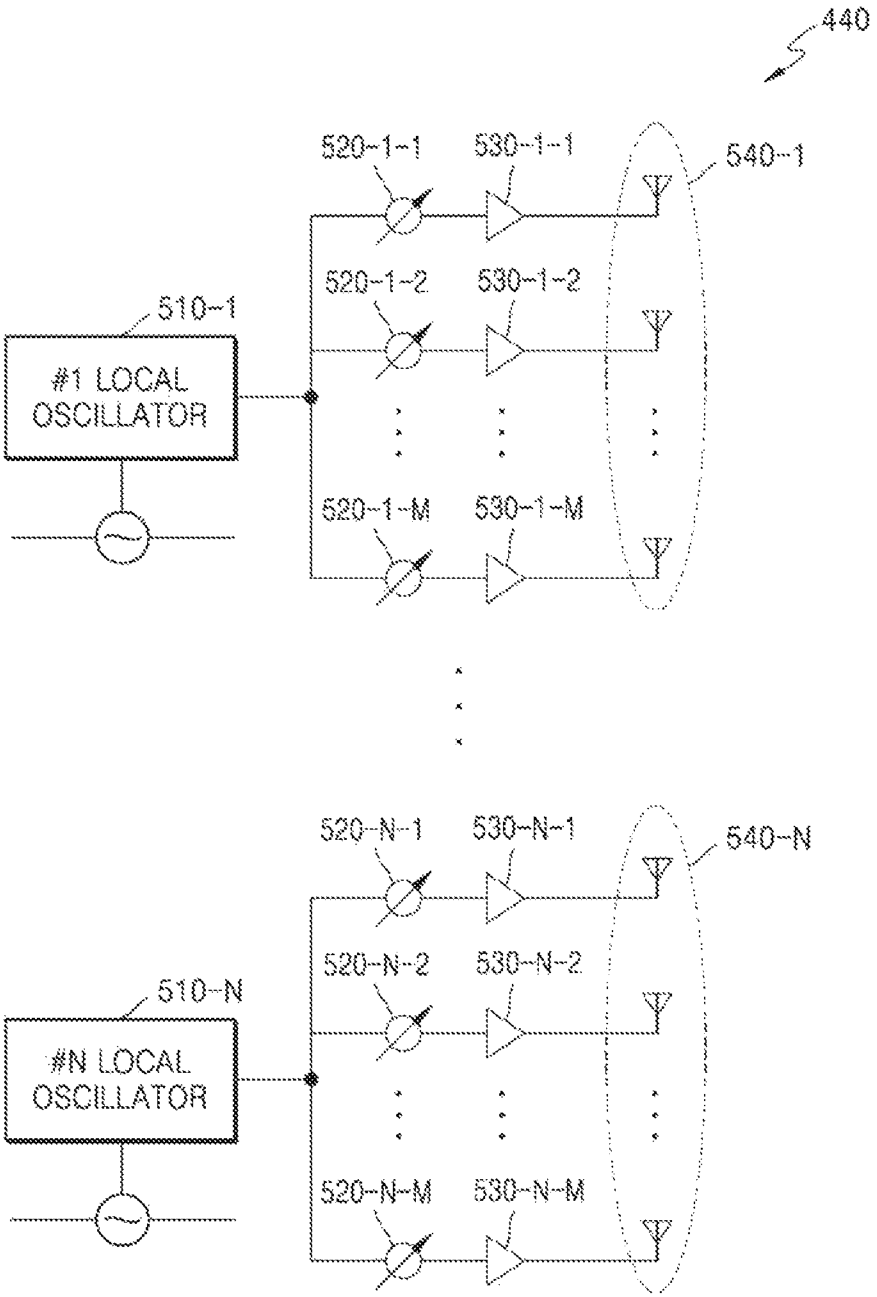
FIG. 5A is a circuit diagram illustrating an analog beamformer including independent phase array antennas according to an embodiment.
Figure 5B:
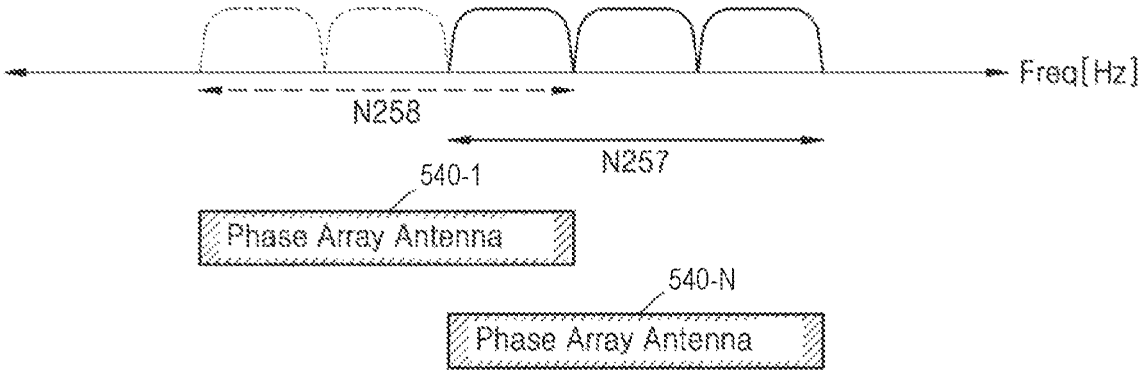
FIG. 5B is a diagram illustrating an example which manages independent phase array antennas in adjacent frequency bands according to an embodiment.
Figure 5C:
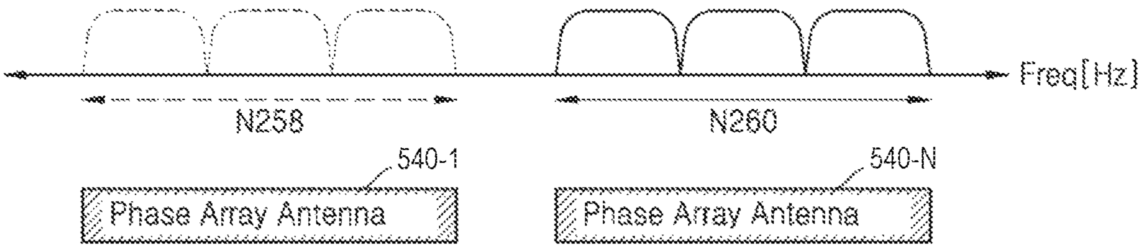
FIG. 5C is a diagram illustrating an example which manages independent phase array antennas in departed frequency bands according to an embodiment.

FIG. 5A is a circuit diagram illustrating an analog beamformer including independent phase array antennas according to an embodiment, FIG. 5B is a diagram illustrating an example which manages independent phase array antennas in adjacent frequency bands according to an embodiment, and FIG. 5C is a diagram illustrating an example which manages independent phase array antennas in departed frequency bands according to an embodiment.

Referring to FIG. 5A, first to $N^{th}$ local oscillators 510-1 to 510-N may be provided. The first to $N^{th}$ local oscillators 510-1 to 510-N may respectively correspond to the first to $N^{th}$ transmission paths 430-1 to 430-N of FIG. 4A, and may be included in the analog beamformer 440. N is an integer greater than 1.

That is, the first local oscillator 510-1 may perform frequency multiplication on a signal received from the first transmission path 430-1, and may transmit the frequency-multiplied signal to a first phase array antenna 540-1, and the $N^{th}$ local oscillator 510-N may perform frequency multiplication on a signal received from the $N^{th}$ transmission path 430-N and may transmit the frequency-multiplied signal to an $N^{th}$ phase array antenna 540-N.

Each of first to $N^{th}$ phase array antennas 540-1 to 540-N may convert and amplify the phases and magnitudes of input signals, and may transmit amplified signals to an external device. For example, in the first phase array antenna 540-1, a signal received through the first transmission path 430-1 may be converted into a signal string having different phases/magnitudes or the same phase/magnitude by a plurality of phase/magnitude shifters 520-1-1 to 520-1-M, amplified by a plurality of amplifiers 530-1-1 to 530-1-M, and transmitted. Here, M is an integer greater than 1.

In the above-described embodiment, FIG. 5A illustrates independent phase array antennas in a case of transmitting a wireless signal, but the inventive concept is not limited thereto. According to various embodiments, in a case of receiving a wireless signal, descriptions about independent phase array antennas may be analogized. For example, wireless signals received through each of the first to $N^{th}$ phase array antennas 540-1 to 540-N may be amplified by amplifiers (for example, the amplifiers 530-1-1 to 530-1-M of FIG. 5A). The phases and magnitudes of the amplified wireless signals may be shifted by phase/magnitude shifters (for example, the phase/magnitude shifters 520-1-1 to 520-1-M of FIG. 5A). The shifted phases and magnitudes may be based on values which are set through reception beamforming. For example, the phase and magnitude of a signal received through the first phase array antenna 540-1 and the phase and magnitude of a signal received through the $N^{th}$ phase array antenna 540-N may be shifted to different phases and magnitudes.

Referring to FIG. 5B, the electronic device 120 may manage independent phase array antennas in adjacent frequency bands. For example, the first phase array antenna 540-1 may receive a wireless signal transmitted through an N258 band (for example, 24,250 Hz to 27,500 Hz), or may transmit a wireless signal through the N258 band. The $N^{th}$ phase array antenna 540-N may receive a wireless signal transmitted through an N257 band (for example, 26,500 Hz to 29,500 Hz), or may transmit a wireless signal through the N257 band.

Each of the first phase array antenna 540-1 and the $N^{th}$ phase array antenna 540-N may be an independent phase array antenna. For example, the first phase array antenna 540-1 and the $N^{th}$ phase array antenna 540-N may be connected to different local oscillators. Therefore, when the first phase array antenna 540-1 is performing analog beamforming on the basis of a first set, the $N^{th}$ phase array antenna 540-N is performing analog beamforming on the basis of an $N^{th}$ set differing from the first set. The first set and the $N^{th}$ set may include different phase/magnitude shift values.

According to various embodiments, the N258 band and the N257 band may include a frequency domain (for example, 26,500 Hz to 27,500 Hz), which is common therebetween. When each of the first phase array antenna 540-1 and the $N^{th}$ phase array antenna 540-N transmits a wireless signal through the common frequency domain, quality may be degraded due to interference between adjacent phase array antennas.

Referring to FIG. 5C, the electronic device 120 may manage independent phase array antennas in different frequency bands. For example, the first phase array antenna 540-1 may receive a wireless signal transmitted through an N258 band (for example, 24,250 Hz to 27,500 Hz), or may transmit a wireless signal through the N258 band. The $N^{th}$ phase array antenna 540-N may receive a wireless signal transmitted through an N260 band (for example, 37,000 Hz to 40,000 Hz), or may transmit a wireless signal through the N260 band. According to various embodiments, when a signal is transmitted and received between different frequency bands, an influence of interference between adjacent phase array antennas illustrated in FIG. 5B may be reduced.

Figure 6A:
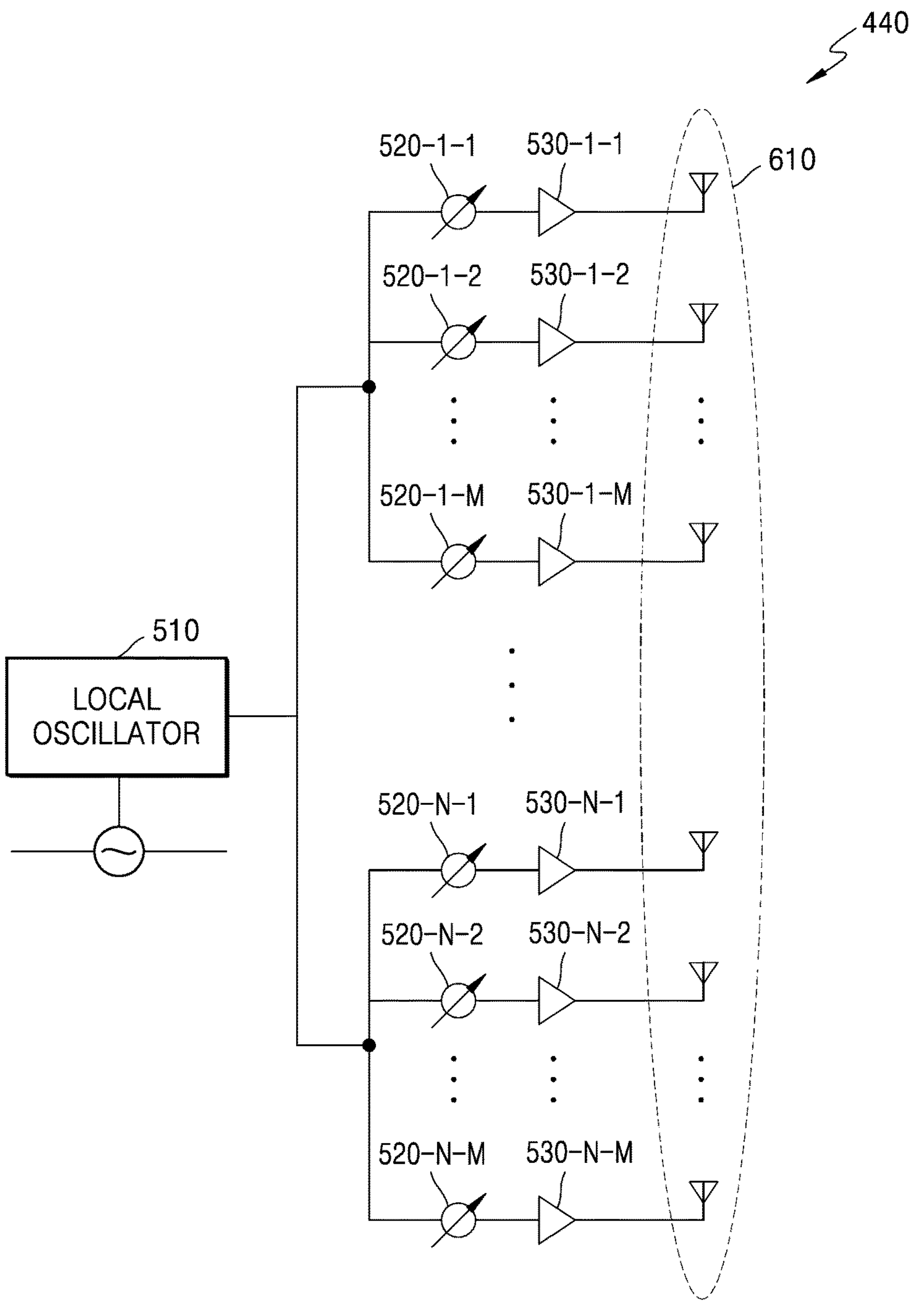
FIG. 6A is a circuit diagram illustrating an analog beamformer including a dependent phase array antenna according to an embodiment.
Figure 6B:
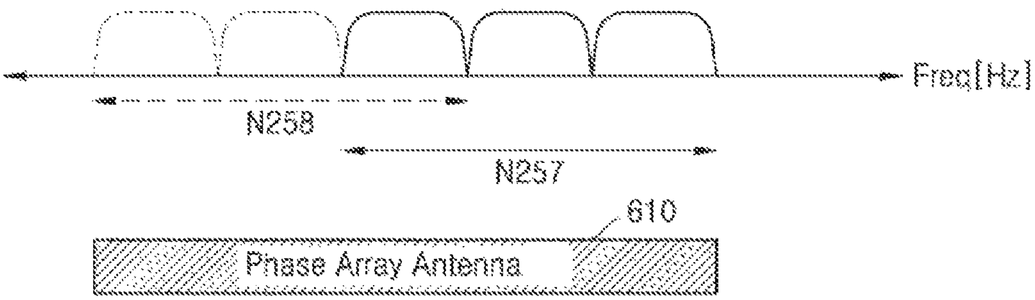
FIG. 6B is a diagram illustrating an example which manages a dependent phase array antenna in adjacent frequency bands according to an embodiment.
Figure 6C:
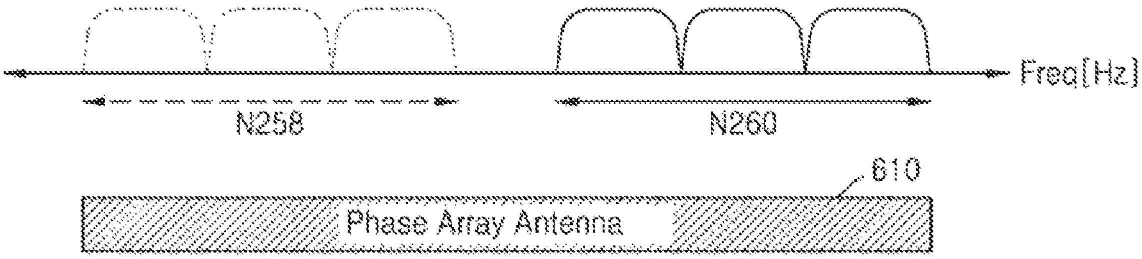
FIG. 6C is a diagram illustrating an example which manages a dependent phase array antenna in different frequency bands according to an embodiment.

FIG. 6A is a circuit diagram illustrating an analog beamformer including a dependent phase array antenna according to an embodiment, FIG. 6B is a diagram illustrating an example which manages a dependent phase array antenna in adjacent frequency bands according to an embodiment, and FIG. 6C is a diagram illustrating an example which manages a dependent phase array antenna in different frequency bands according to an embodiment.

Referring to FIG. 6A, a dependent phase array antenna including a plurality antennas are illustrated. For example, first antennas corresponding to the first phase array antenna 540-1 of FIG. 5A and $N^{th}$ antennas corresponding to the $N^{th}$ phase array antenna 540-N of FIG. 5A may be connected to a local oscillator 510 in common. Here, these antennas connected to the local oscillator 510 may constitute or correspond to a single phase array antenna 610.

Referring to FIGS. 6A and 5A, in FIG. 5A, the first phase array antenna 540-1 may be connected to the first local oscillator 510-1, and the $N^{th}$ phase array antenna 540-N may be connected to the $N^{th}$ local oscillator 510-N, and thus, the magnitude of frequency multiplication performed by the first local oscillator 510-1 may differ from that of frequency multiplication performed by the $N^{th}$ local oscillator 510-N, whereby each of the first local oscillator 510-1 and the $N^{th}$ local oscillator 510-N may independently perform analog beamforming. On the other hand, in FIG. 6A, a plurality of antennas may be connected to a common local oscillator, and thus, may depend on each other. For example, in a case where the first antenna performs analog beamforming on the basis of a first set, a phase and a magnitude of a signal received through the $N^{th}$ antennas may be modulated and amplified based on the first set. As another example, in a case where the $N^{th}$ antennas perform analog beamforming on the basis of a $N^{th}$ set, a phase and a magnitude of a signal received through the first antennas may be modulated and amplified based on the $N^{th}$ set.

In the above-described embodiment, FIG. 6A illustrates the single dependent phase array antenna 610 in a case of transmitting a wireless signal, but the inventive concept is not limited thereto. According to various embodiments, in a case of receiving a wireless signal, descriptions about the single dependent phase array antenna 610 may be analogized. For example, wireless signals received through the single dependent phase array antenna 610 may be amplified by amplifiers (for example, the amplifiers 530-1-1 to 530-1-M of FIG. 6A). The phases and magnitudes of the amplified wireless signals may be shifted by phase/magnitude shifters (for example, the phase/magnitude shifters 520-1-1 to 520-1-M of FIG. 6A). The shifted phases and magnitudes may be based on values which are set through reception beamforming. For example, signals received through the single dependent phase array antenna 610 may be depend on the common local oscillator 510, and thus, the phases and magnitudes of the received signals may be shifted to the same phases and magnitudes.

Referring to FIG. 6B, it may be understood that the first antennas and the $N^{th}$ antennas respectively corresponding to the first phase array antenna 540-1 and the $N^{th}$ phase array antenna 540-N of FIG. 5B depend on each other, and thus, constitute a phase array antenna 610. In FIG. 5B, in order to receive a signal of an N258 band, the first phase array antenna 540-1 may perform analog beamforming according to the first set to receive an optimal reception beam, and in order to receive a signal of an N257 band, the $N^{th}$ phase array antenna 540-N may perform analog beamforming according to the $N^{th}$ set to receive an optimal reception beam. On the other hand, the phase array antenna 610 of FIG. 6B may not perform analog beamforming on a signal of each of the N257 band and an N258 band. Therefore, according to an embodiment, in a case where the phase array antenna 610 performs analog beamforming on the basis of the first set so as to receive a signal of the N258 band as an optimal beam, an optimal beam for the N257 band may need analog beamforming based on the $N^{th}$ set, and due to this, the reception quality of the N257 band may be degraded. According to another embodiment, in a case where the phase array antenna 610 performs analog beamforming on the basis of the $N^{th}$ set so as to receive a signal of the N257 band as an optimal beam, an optimal beam for the N258 band may need analog beamforming based on the first set, and due to this, the reception quality of the N258 band may be degraded.

Referring to FIG. 6C, it may be understood again that the first antennas and the $N^{th}$ antennas respectively corresponding to the first phase array antenna 540-1 and the $N^{th}$ phase array antenna 540-N of FIG. 5C depend on each other, and thus, constitute the phase array antenna 610. In FIG. 5C, in order to receive a signal of the N258 band, when the first phase array antenna 540-1 performs analog beamforming on the basis of the first set, the first phase array antenna 540-1 may receive an optimal reception beam. In order to receive a signal of the N260 band, when the $N^{th}$ phase array antenna 540-N performs analog beamforming on the basis of the $N^{th}$ set, the $N^{th}$ phase array antenna 540-N may receive an optimal reception beam. On the other hand, the phase array antenna 610 of FIG. 6C may not perform analog beamforming based on the first set and the $N^{th}$ set on a signal of each of the N258 band and the N260 band. Therefore, according to an embodiment, in a case where the phase array antenna 610 performs analog beamforming on the basis of the first set so as to receive a signal of the N258 band as an optimal beam, an optimal beam for the N260 band may need analog beamforming based on the $N^{th}$ set, and due to this, the reception quality of the N260 band may be degraded. According to another embodiment, in a case where the phase array antenna 610 performs analog beamforming on the basis of the $N^{th}$ set so as to receive a signal of the N260 band as an optimal beam, an optimal beam for the N258 band may need analog beamforming based on the first set, and due to this, the reception quality of the N258 band may be degraded.

Figure 7:
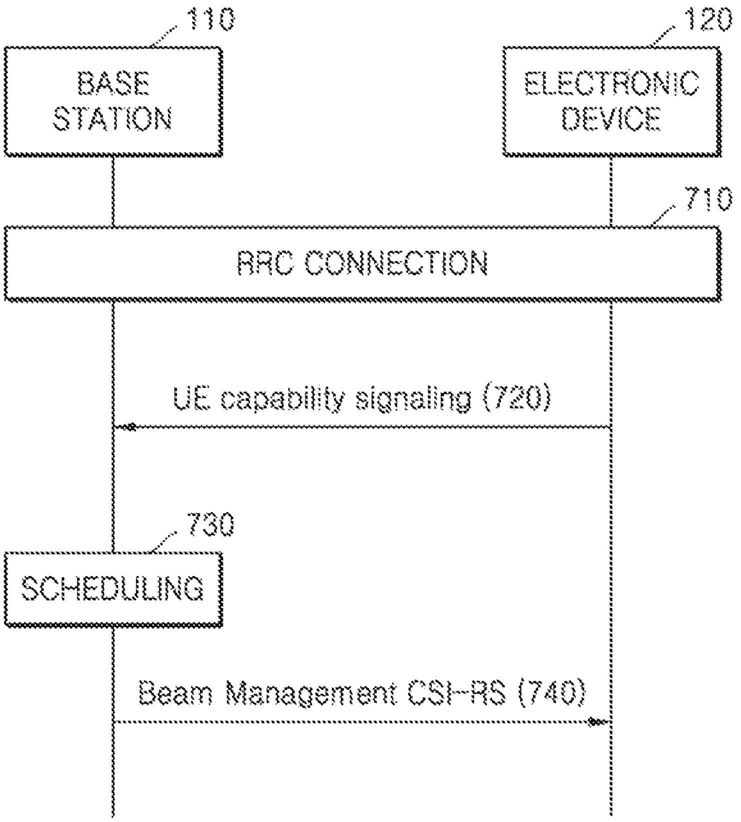
FIG. 7 is a diagram illustrating an example where a signal is exchanged between a base station and an electronic device according to an embodiment.

FIG. 7 is a diagram illustrating an example where a signal is exchanged between a base station and an electronic device according to an embodiment.

Referring to FIG. 7, in operation 710, an electronic device 120 may be connected to a base station 110. That is, the electronic device 120 may correspond to a radio resource control (RRC) connected mode.

In operation 720, the electronic device 120 may transmit terminal capability information (i.e., UE capability information) to the base station 110. The UE capability information may include information about a frequency band receivable by the electronic device 120, a component carrier (CC) in the frequency band, and a maximum frequency range capable of being processed based on discontinuous CC allocation in the frequency band, not being limited thereto. For example, referring to TS 38.331 v15.2.0, the UE capability information may be as following table.

TABLE 1

```
FreqBandList ::=                    SEQUENCE (SIZE (1..maxBandsMRDC)) OF FreqBandInformation
FreqBandInformation ::=        CHOICE {
        bandInformationEUTRA                FreqBandInformationEUTRA,
        bandInformationNR                         FreqBandInformationNR
}
```

TABLE 1-continued

```
FreqBandInformationEUTRA ::=        SEQUENCE {
        bandEUTRA                                   FreqBandIndicatorEUTRA,
        ca-BandwidthClassDL-EUTRA           CA-BandwidthClassEUTRA
                OPTIONAL,       -- Need N
        ca-BandwidthClassUL-EUTRA           CA-BandwidthClassEUTRA
                OPTIONAL        -- Need N
}
FreqBandInformationNR ::=           SEQUENCE {
        bandNR                                      FreqBandIndicatorNR,
        maxBandwidth RequestedDL                AggregatedBandwith
        OPTIONAL,       -- Need N
        maxBandwidth RequestedUL                AggregatedBandwith
        OPTIONAL,       -- Need N
        maxCarriersRequestedDL              INTEGER (1.. maxNrofServingCells)
        OPTIONAL,       -- Need N
        maxCarriersRequestedUL              INTEGER (1.. maxNrofServingCells)
        OPTIONAL        -- Need N
}
AggregatedBandwith :=               ENUMERATED {mhz50, mhz100, mhz150, mhz200, mhz250,
mhz300, mhz350,mhz400, mhz450, mhz500, mhz550, mhz600, mhz650, mhz700, mhz750, mhz800}
FeatureSetDownlink ::=                      SEQUENCE {
        featureSetListPerDownlinkCC             SEQUENCE (SIZE (1..maxNrofServingCells)) OF
FeatureSetDownlinkPerCC-Id,
        intraBandFreqSeparationDL                   FreqSeparationClass
        OPTIONAL,
scalingFactor                                       ENUMERATED
```

According to various embodiments, the electronic device 120 may add UE management information to the UE capability information, and may transmit the UE capability information to the base station 110. The electronic device 120 may periodically transmit the UE capability information to the base station 110. For example, the UE management information may include index information about frequency bands receivable by a plurality of phase array antennas and a combination thereof and index information about a plurality of phase array antennas capable of receiving frequency bands and a combination thereof.

According to various embodiments, the UE management information may include information indicating indexes of phase array antennas capable of receiving a wireless signal of each frequency band for each frequency band. The information may be referred to as NeedForBeamInterruption. A NeedForBeamInterruption value may be [0–Maximum number of Phase Arrays]. That is, the NeedForBeamInterruption may include phase array antenna indexes for supporting a corresponding band within a range of a maximum number of phase array antennas capable of receiving a wireless signal from 0. For example, referring to FIG. 5B, NeedForBeamInterruption value of the N258 band may correspond to the first phase array antenna 540-1, and NeedForBeamInterruption value of the N257 band may correspond to the N$^{th}$ phase array antenna 540-N. As another example, referring to FIG. 5C, a NeedForBeamInterruption value of the N258 band may correspond to the first phase array antenna 540-1, and a NeedForBeamInterruption value of the N257 band may correspond to the N$^{th}$ phase array antenna 540-N. As another example, referring to FIG. 6B, all of the N257 band and the N258 band may correspond to the phase array antenna 610. According to an embodiment, when NeedForBeamInterruption is included in the UE capability information, the UE capability information may be described as following table.

TABLE 2

```
FreqBandInformationNR ::=           SEQUENCE {
        bandNR                                      FreqBandIndicatorNR,
        maxBandwidthRequestedDL                 AggregatedBandwith
        OPTIONAL,       -- Need N
        maxBandwidth RequestedUL                AggregatedBandwith
        OPTIONAL,       -- Need N
        maxCarriersRequestedDL              INTEGER (1.. maxNrofServingCells)
        OPTIONAL,       -- Need N
        maxCarriersRequestedUL              INTEGER (1.. maxNrofServingCells)
        OPTIONAL        -- Need N
}
AggregatedBandwith ::=              ENUMERATED {mhz50, mhz100, mhz150, mhz200, mhz250,
mhz300, mhz350,mhz400, mhz450, mhz500, mhz550, mhz600, mhz650, mhz700, mhz750, mhz800}
FeatureSetDownlink ::=                      SEQUENCE {
        featureSetListPerDownlinkCC             SEQUENCE (SIZE (1..maxNrofServingCells)) OF
FeatureSetDownlinkPerCC-Id,
        NeedForBeamInterruption                 INTEGER (1..maxNrofPhAs)
OPTIONAL        -- Need N
        intraBandFreqSeparationDL                   FreqSeparationClass
        OPTIONAL,
scalingFactor                                       ENUMERATED
```

According to various embodiments, the UE management information may include information indicating frequency bands enabling each phase array antenna to receive a wireless signal. The information may be referred to as NeedForBeamInterruption. A NeedForBeamInterruption value may be [BandComb1–BandComb_N]. The N may correspond to the number of combinations of all frequency bands included in a frequency range receivable by the electronic device 120. For example, when the N258 band, the N257 band, the N261 band, and the N260 band are included in the frequency range receivable by the electronic device 120, the index may be represented in an index mapping table as follows.

TABLE 3

| BandComb | N258 band (24250 Hz-27500 Hz) | N257 band (26500 Hz-29500 Hz) | N261 band (27500 Hz-28350 Hz) | N260 band (37000 Hz-40000 Hz) |
|---|---|---|---|---|
| 1 | O | | | |
| 2 | | O | | |
| 3 | | | O | |
| 4 | | | | O |
| 5 | O | O | | |
| 6 | O | | O | |
| 7 | O | | | O |
| 8 | | | O | O |
| 9 | O | O | | O |

Referring to Table 3, it may be seen that the number of kinds capable of combining the four frequency bands is total nine. For example, an N261 band may be included in a frequency range of the N257 band, and thus, the N261 band and the N257 band may not be counted as a total number capable of combining. That is, a NeedForBeamInterruption value of each phase array antenna may correspond to a value of 1 to 9. For example, referring to FIG. 5B, assuming that an $N^{th}$ phase array antenna is capable of covering the N261 band (not shown), a NeedForBeamInterruption value of a first phase array antenna may correspond to 2 (the N258 band and the N257 band), and a NeedForBeamInterruption value of the $N^{th}$ phase array antenna may correspond to 3 (the N258 band, the N257 band, and the N261 band). As another example, referring to FIG. 5C, the NeedForBeamInterruption value of the first phase array antenna may correspond to 2 (the N258 band and the N257 band), and the NeedForBeamInterruption value of the $N^{th}$ phase array antenna may correspond to 1 (the N260 band). For example, when NeedForBeamInterruption is included in the UE capability information, the UE capability information may be described as following table.

TABLE 4

```
FreqBandInformationNR ::=                    SEQUENCE {
        bandNR                                           FreqBandIndicatorNR,
        maxBandwidth RequestedDL                   AggregatedBandwith
        OPTIONAL,       -- Need N
        maxBandwidthRequestedUL                    AggregatedBandwith
        OPTIONAL,       -- Need N
        maxCarriersRequestedDL                 INTEGER (1 .. maxNrofServingCells)
        OPTIONAL,       -- Need N
        maxCarriersRequestedUL                 INTEGER (1 .. maxNrofServingCells)
        OPTIONAL       -- Need N
          NeedForBeamInterruption (BandComb_1, ..., BandComb_NrofPhAs)           OPTIONAL       -- Need
N
}
AggregatedBandwith ::=                       ENUMERATED {mhz50, mhz100, mhz150, mhz200, mhz250,
mhz300, mhz350,mhz400, mhz450, mhz500, mhz550, mhz600, mhz650, mhz700, mhz750, mhz800}
BandComb_n ::=                     ENUMERATED {n257, n258, n260, n261, n257_n258, n258_n261,
n258_n260, n260_n261, n257_n258_n260}
```

According to various embodiments, the UE management information may include information indicating component carriers grouped into one or more phase array antennas. The information may be referred to as NeedForBeamInterruption. According to an embodiment, an index indicating component carriers usable as a ServCellIndex value of quasi-co-located (QCL) information having a transmission configuration indicator (TCI) may be transmitted as a NeedForBeamInterruption value. The UE management information may include information about a plurality of frequency bands covered by a phase array antenna among the phase array antennas transmitted to the base station on the basis of transmission configuration indicator (TCI) state information. For example, when NeedForBeamInterruption is included in the UE capability information, the UE capability information may be described as following table.

TABLE 5

```
TCI-State ::=                          SEQUENCE {
        tci-StateId                              TCI-StateId,
        qcl-Type1                                QCL-Info,
```

TABLE 5-continued

```
        qcl-Type2                                              QCL-Info
        ...                         OPTIONAL,     -- Need R
}
QCL-Info ::=                                          SEQUENCE {
        cell                                                           ServCellIndex
                         OPTIONAL,     -- Need R              BWP-Id
        bwp-Id
                         OPTIONAL, -- Cond CSI-RS-Indicated
        referenceSignal                               CHOICE {
                csi-rs                                                        NZP-CSI-RS-
ResourceId,
                ssb                                                           SSB-Index
        },
        qcl-Type                                               ENUMERATED {typeA, typeB,
typeC, typeD},
        ...
}
```

In operation 730, the base station 110 may perform scheduling for resource allocation. The base station 110 may decode the UE management information received from the electronic device 120 to identify a frequency band which enables a plurality of phase array antennas included in the electronic device 120 to receive a wireless signal. For example, the base station 110 may identify a first frequency band and a second frequency band as a frequency band where a first phase array antenna of the electronic device 120 operates. In this case, the base station 110 may allocate resources on the basis that analog beamforming of the first frequency band and analog beamforming of the second frequency band are simultaneously performed by the first phase array antenna. For example, in a case where the first frequency band and the second frequency band operate by using different phase array antennas, even when a channel state information-reference signal (CSI-RS) for beam training is transmitted at different symbol timings, analog beamforming may be performed and the CSI-RS signal may be successfully received. On the other hand, in a case where the first frequency band and the second frequency band operate by using the same phase array antenna, when data is allocated to the first frequency band at a certain symbol timing and a CSI-RS symbol for the beam training is allocated to the second frequency band, analog beamforming may be performed for receiving the CSI-RS in the second frequency band, and thus, the phase and magnitude of a reception beam may be shifted in the first frequency band, causing failure of data reception.

In operation 740, the base station 110 may transmit a CSI-RS for beam management to the electronic device 120. The base station 110 may optimize a time, at which a CSI-RS symbol is allocated, for each frequency band on the basis of the UE management information. For example, when the first frequency band and the second frequency band correspond to different phase array antennas, a symbol timing at which the electronic device 120 transmits a CSI-RS of the first frequency band may not match a symbol timing at which the electronic device 120 transmits a CSI-RS of the second frequency band. That is, when the CSI-RS symbol is being transmitted in the first frequency band, the electronic device 120 may transmit a data symbol in the second frequency band. As another example, when the first frequency band and the second frequency band correspond to the same phase array antenna, the electronic device 120 may synchronize a symbol timing, at which the electronic device 120 transmits the CSI-RS of the first frequency band, with a symbol timing at which the electronic device 120 transmits the CSI-RS of the second frequency band. That is, the electronic device 120 may allocate resources such that beam training or beam sweeping is performed on the first frequency band and the second frequency band at the same symbol timing.

Figure 8A:
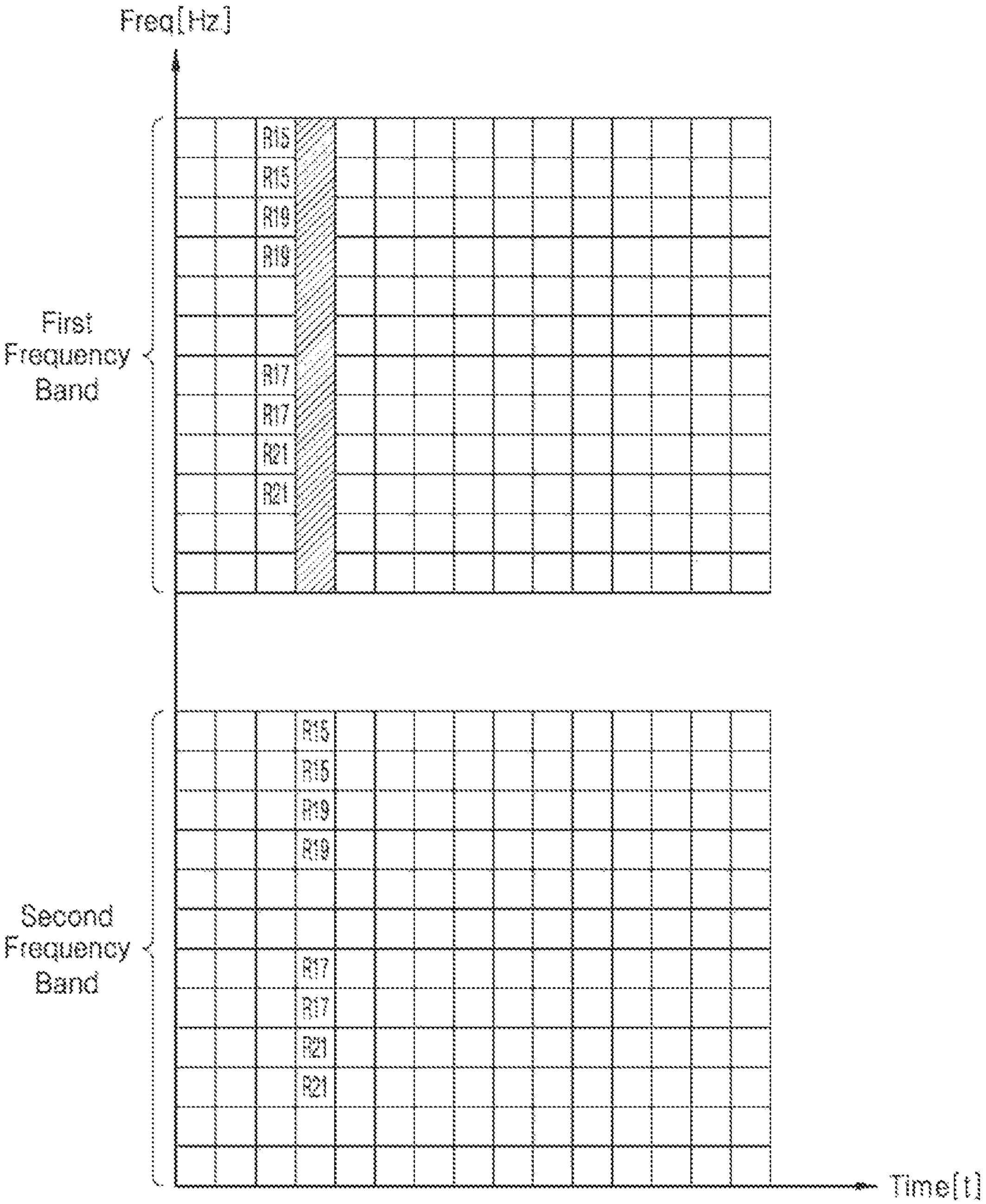
FIG. 8A is a diagram illustrating an example which manages a dependent phase array antenna in a case of a single subcarrier interval according to an embodiment.
Figure 8B:
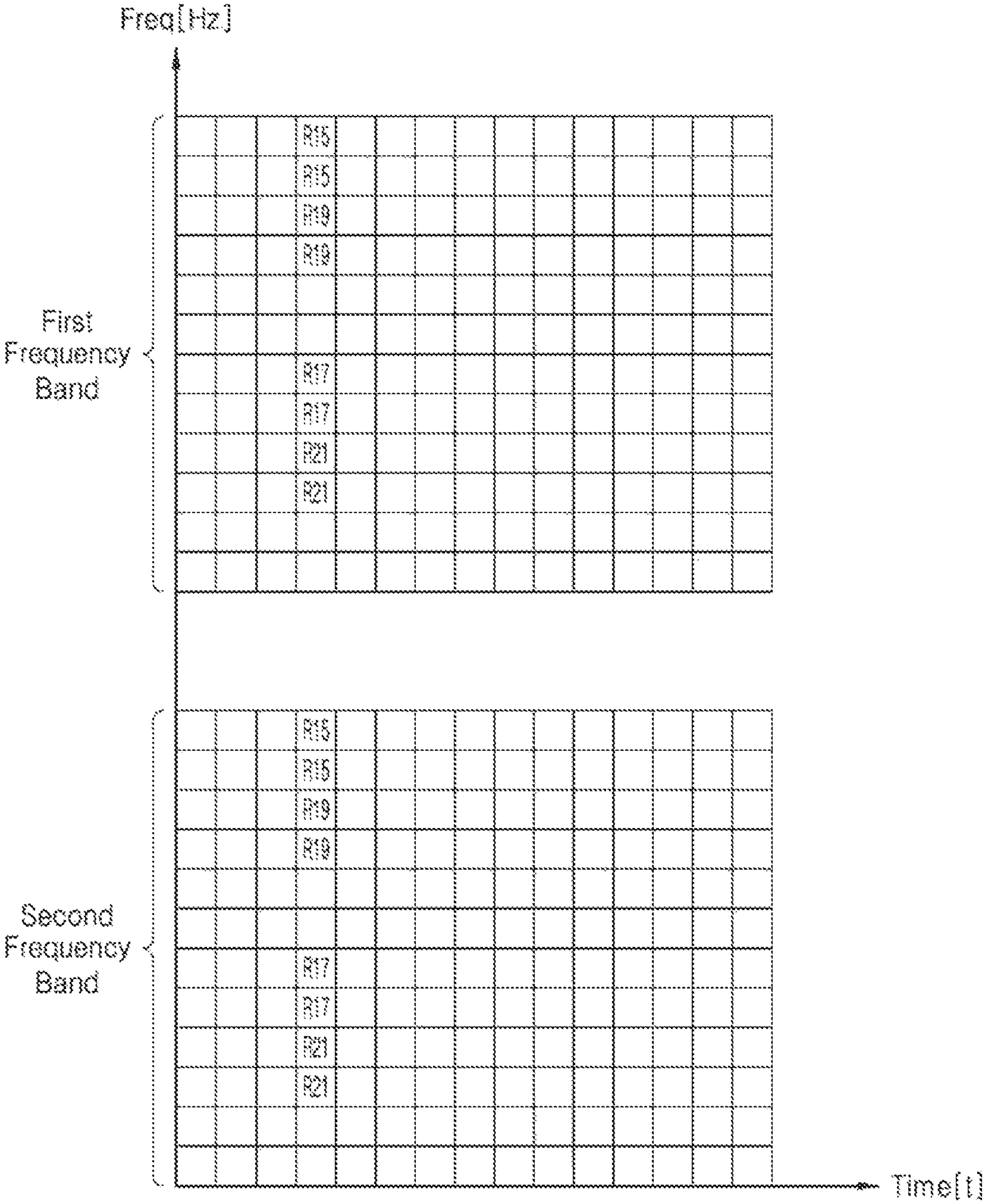
FIG. 8B is a diagram illustrating another example which manages a dependent phase array antenna in a case of a single subcarrier interval according to an embodiment.

FIG. 8A is a diagram illustrating an example which manages a dependent phase array antenna in a case of a single subcarrier interval according to an embodiment, and FIG. 8B is a diagram illustrating another example which manages a dependent phase array antenna in a case of a single subcarrier interval according to an embodiment.

Referring to FIG. 8A, a first frequency band and a second frequency band of a single subcarrier interval are illustrated. The single subcarrier interval may denote that a length of a symbol is the same between the first frequency band and the second frequency band. According to new radio, a subcarrier interval may be set to one of 60 KHz and 120 KHz. According to FIG. 8A, UE management information may not be transmitted and received between the electronic device 120 and the base station 110, and the base station 110 may not have information about a phase array antenna, corresponding to each frequency band, of the electronic device 120.

The first frequency band may receive a CSI-RS for beam training at a third symbol timing. That is, in order to perform beam training in the first frequency band, a phase array antenna may shift the phase and magnitude of a reception beam during a third symbol.

The second frequency band may receive a CSI-RS for beam training at a fourth symbol timing. That is, in order to perform beam training in the second frequency band, a phase array antenna may shift the phase and magnitude of a reception beam during a fourth symbol.

In this case, the first frequency band may receive a data signal at a fourth symbol timing. For example, a data signal may be received at the fourth symbol timing by using an optimal reception beam which is identified based on the beam training at the third symbol timing. The first frequency band and the second frequency band may be covered or controlled by the same phase array antenna, and thus, when beam training is performed in the second frequency band during the fourth symbol timing, the phase and magnitude of a reception beam of the first frequency band may be shifted. Therefore, the data signal received through the first frequency band may be received by using a reception beam having a phase and a magnitude which differ from those of an optimal beam, and in a worst case, decoding of received data may fail.

Referring to FIG. 8B, the electronic device 120 may transmit UE management information to the base station 110. The base station 110 may obtain information about a phase array antenna of the electronic device 120 for each frequency band, based on the UE management information. For example, the base station 110 may identify that the first frequency band and the second frequency band are controlled by the same phase array antenna. According to an embodiment, the identification may be performed by receiving information indicating a combination of frequency bands for receiving a wireless signal for each phase array antenna. For example, a NeedForBeamInterruption value of a first phase array antenna may correspond to one value among 5 to 8.

The base station 110 may perform scheduling and resource allocation on the first frequency band and the second frequency band. For example, the electronic device 120 may identify that the whole phase and magnitude of a signal output from a phase array antenna are shifted due to beam training of the second frequency band at a fourth symbol timing, and thus, may synchronize a beam training time of the first frequency band with the fourth symbol timing in the second frequency band. Therefore, the electronic device 120 may prevent a data packet from being dropped or the reception sensitivity of a data signal of the first frequency band from being reduced due to beam training for the second frequency band at the fourth symbol timing.

In the above-described embodiment, FIG. 8B is illustrated with respect to delaying a beam training time in the first frequency band, but the inventive concept is not limited thereto. According to various embodiments, the electronic device 120 may advance a beam training time in the second frequency band to a third symbol timing. Also, the electronic device 120 may perform control to maintain a beam training time in each of the first frequency band and the second frequency band, and receive only dummy data at the fourth symbol timing in the first frequency band.

Figure 9A:
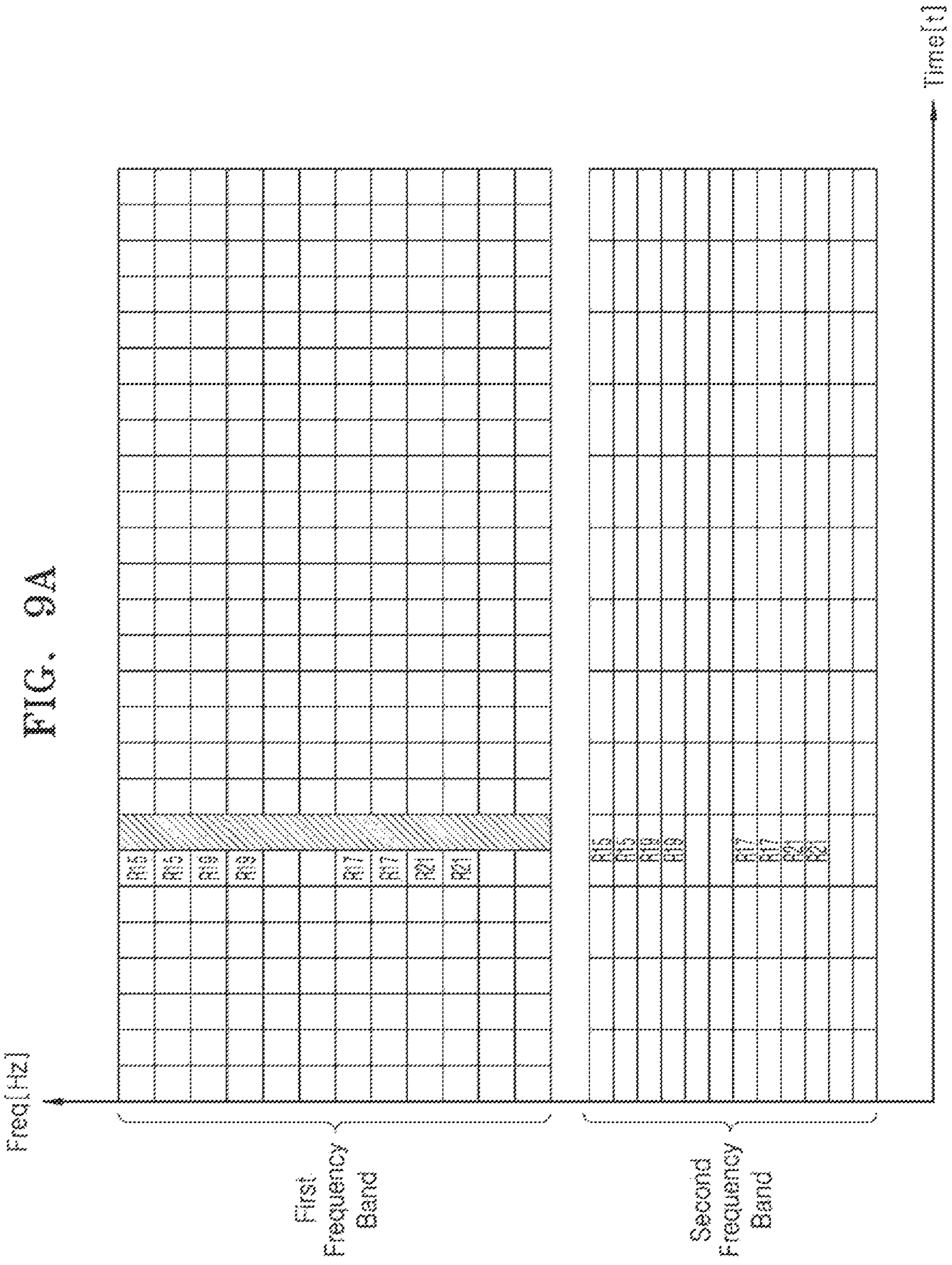
FIG. 9A is a diagram illustrating an example which manages a dependent phase array antenna in a case of a multi-subcarrier interval according to an embodiment.
Figure 9B:
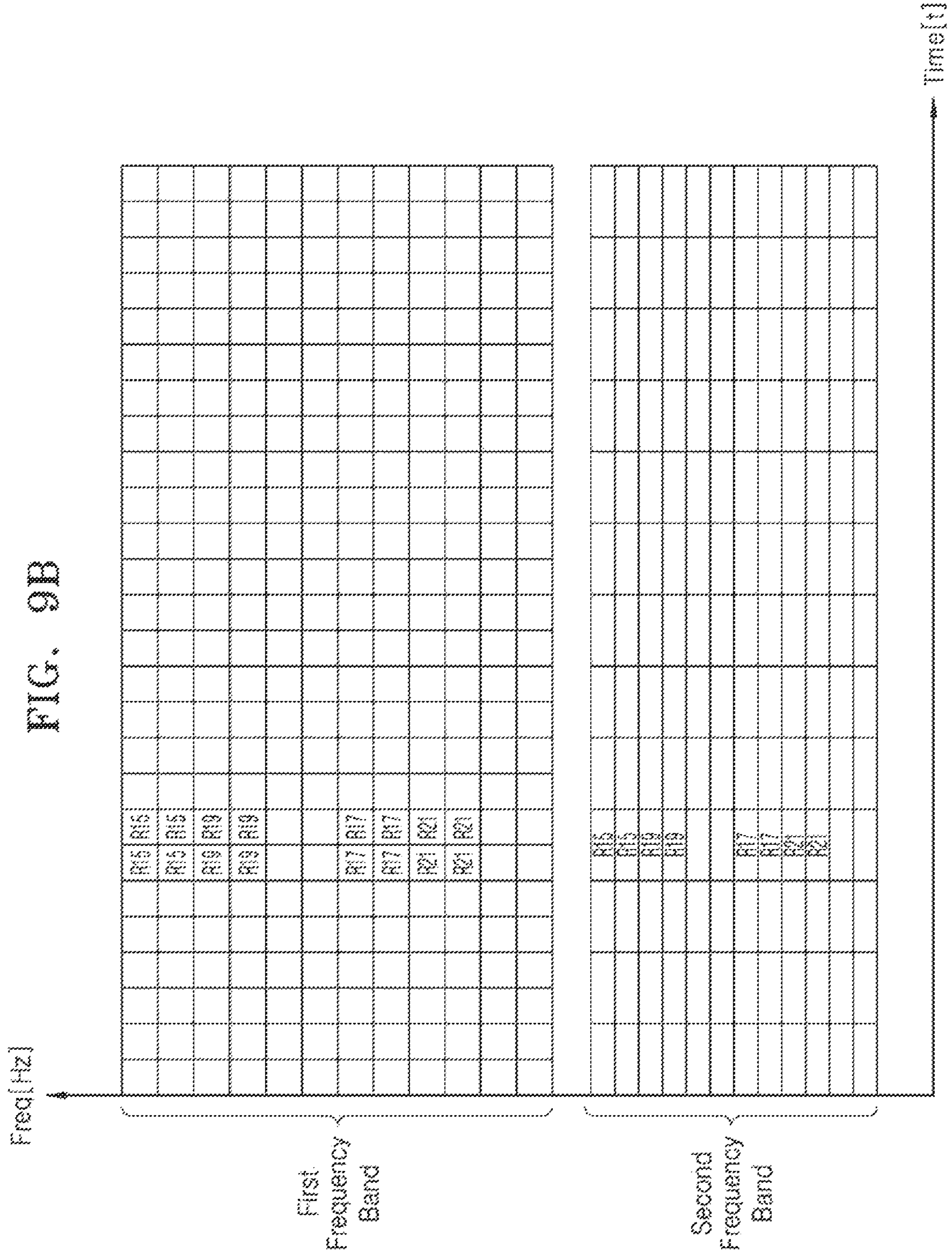
FIG. 9B is a diagram illustrating another example which manages a dependent phase array antenna in a case of a multi-subcarrier interval according to an embodiment.

FIG. 9A is a diagram illustrating an example which manages a dependent phase array antenna in a case of a multi-subcarrier interval according to an embodiment, and FIG. 9B is a diagram illustrating another example which manages a dependent phase array antenna in a case of a multi-subcarrier interval according to an embodiment.

Referring to FIG. 9A, a first frequency band and a second frequency band of a multi-subcarrier interval are illustrated. A symbol length of the first frequency band may differ from that of the second frequency band. For example, in a case where a subcarrier interval of the first frequency band is 120 KHz and a subcarrier interval of the second frequency band may be 60 KHz, the symbol length of the first frequency band may correspond to half of a symbol length of the second frequency band. For example, a second symbol period of the second frequency band may be the same as a period corresponding to a sum of a third symbol and a fourth symbol of the first frequency band.

According to FIG. 9A, UE management information may not be transmitted and received between the electronic device 120 and the base station 110, and the base station 110 may not have information about a phase array antenna, corresponding to each frequency band, of the electronic device 120.

The first frequency band may receive a CSI-RS for beam training at a seventh symbol timing. That is, in order to perform beam training in the first frequency band, a phase array antenna may shift the phase and magnitude of a reception beam during a seventh symbol. Since the second frequency band has a subcarrier interval of 60 KHz, a seventh symbol period of the first frequency band may correspond to a first half period of a fourth symbol of the second frequency band.

The first frequency band may receive a CSI-RS for beam training during the seventh symbol, and may receive a data signal during an eighth symbol. On the other hand, in the second frequency band, a subcarrier interval may decrease by half, and thus, a symbol period may increase by twice, whereby the first frequency band may still receive a CSI-RS for beam training at an eighth symbol timing at which the data signal is received. Analog beamforming may be performed on the first frequency band and the second frequency band by the same phase array antenna, and thus, the phase and magnitude of a reception beam may be shifted at an eighth symbol timing in the first frequency band. Therefore, a data signal received through the first frequency band may be received by using a reception beam having a phase and a magnitude which differ from those of an optimal beam, and in a worst case, decoding of received data may fail. Accordingly, when the base station 110 performs resource allocation without considering a multi-subcarrier interval, the electronic device 120 may not receive a data signal of an eighth symbol of the first frequency band corresponding to a second half period of a fourth symbol of the second frequency band.

Referring to FIG. 9B, the electronic device 120 may transmit and receive UE management information to and from the base station 110. The base station 110 may obtain information about a phase array antenna of the electronic device 120 for each frequency band, based on the UE management information. For example, the base station 110 may identify that the first frequency band and the second frequency band are covered or controlled by the same phase array antenna.

The base station 110 may perform scheduling and resource allocation on the first frequency band and the second frequency band on the basis of the multi-subcarrier interval as well as the UE management information. For example, the base station 110 may identify that a fourth symbol timing in the second frequency band corresponds to a seventh symbol and an eighth symbol of the first frequency band, and thus, may set a period, where a CSI-RS is transmitted in the first frequency band, to two symbol periods. Therefore, the electronic device 120 may prevent the phase and magnitude of a reception beam from being shifted, the reception sensitivity of a signal from being reduced, or a data packet from being dropped due to beam training of the second frequency band at the eighth symbol timing in the first frequency band.

In the above-described embodiment, FIG. 9B is illustrated with respect to increasing a beam training time in the first frequency band by twice, but the inventive concept is not limited thereto. According to various embodiments, the base station 110 may allocate resources to maintain a beam training time in each of the first frequency band and the second frequency band, and transmit only dummy data at the eighth symbol timing in the first frequency band.

Figure 10:
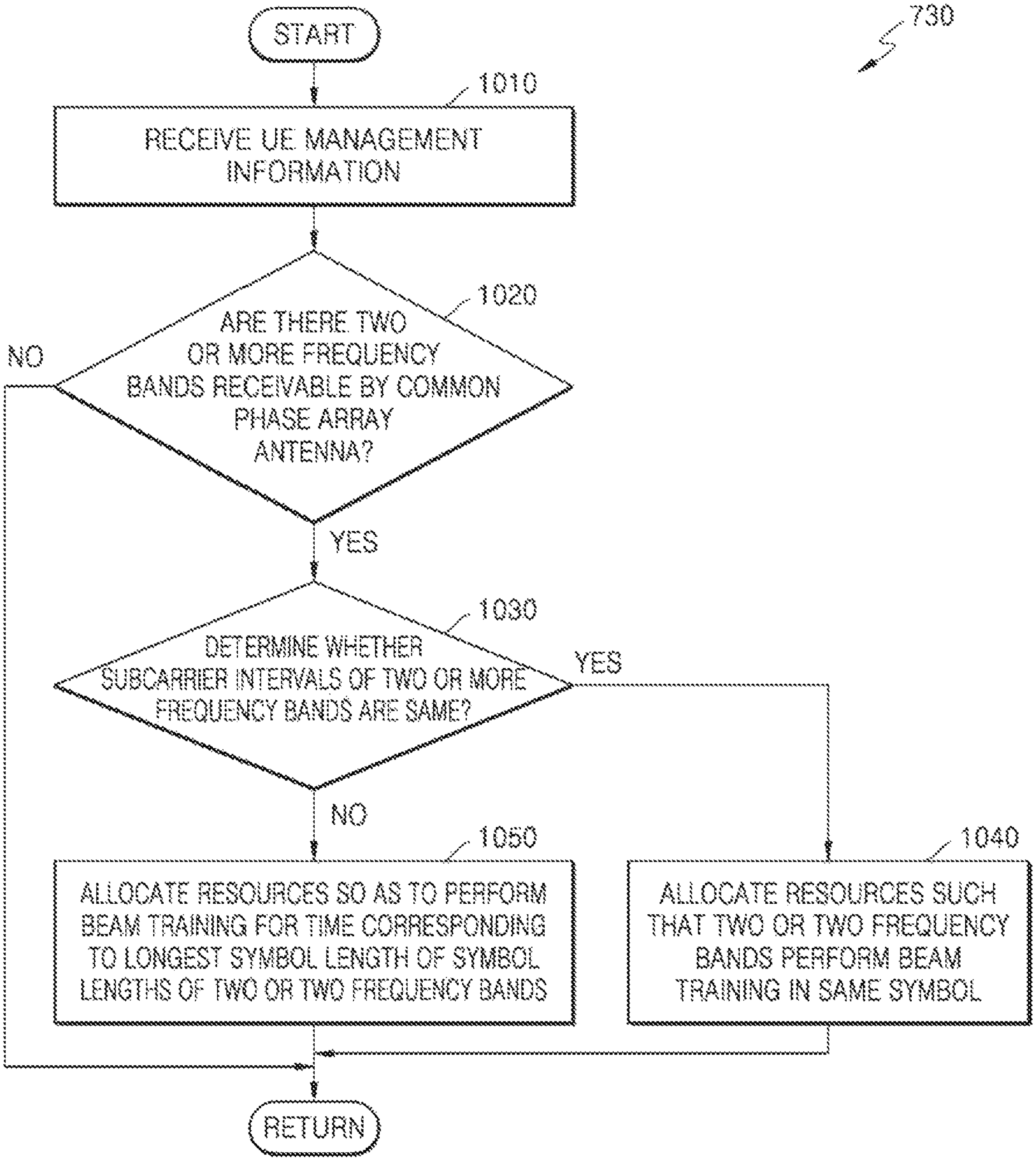
FIG. 10 is a flowchart illustrating scheduling performed by a base station according to an embodiment.

FIG. 10 is a flowchart illustrating scheduling performed by a base station according to an embodiment.

Referring to FIG. 10, in operation 1010, the base station 110 may receive UE management information. The UE management information may include information about frequency bands covered by each of the plurality of phase array antennas of the electronic device.

In operation 1020, the base station 110 may determine whether there are two or more frequency bands receivable by a common (or single) phase array antenna of the electronic device. For example, the UE management information may include index information indicating frequency bands enabling each phase array antenna to receive a wireless signal. Referring to Table 3 shown above, when an index value is not 1 to 4, the base station 110 may identify that there are two or more frequency bands receivable by the common phase array antenna.

In operation 1030, the base station 110 may determine whether subcarrier intervals of the two or more frequency bands are the same. When subcarrier intervals of the frequency bands differ, lengths of symbols may differ, and thus, may be considered in allocating resources. When the subcarrier intervals of the two or more frequency bands differ, operation 1050 may be performed, and when the subcarrier intervals of the two or more frequency bands are the same, operation 1040 may be performed.

In operation 1040, the base station 110 may allocate resources so that a beam training is performed at a same symbol timing in the two or more frequency bands. In operation 1050, the base station 110 may allocate resources so as to perform beam training at a time corresponding to a longest symbol length among symbol lengths of the two or more frequency bands. For example, when a subcarrier interval of a first frequency band is twice a subcarrier interval of a second frequency band, a symbol length of the first frequency band may be half of a symbol length of the second frequency band, and thus, the base station 110 may allocate resources so as to perform beam training at one symbol timing in the second frequency band during two symbol timings in the first frequency band.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in FIGS. 2 to 4B may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to embodiments thereof, it will be understood that various changes in form and details may be made therein without departing from the spirit and scope of the claims.

What is claimed is:

1. An electronic device comprising:

a communication interface comprising a first antenna and a second antenna;

a storage configured to store user equipment (UE) management information comprising first information corresponding to the first antenna, and second information corresponding to the second antenna; and a controller configured to control to transmit the UE management information to a base station, wherein the first antenna and the second antenna are controlled by a common oscillator, wherein the first information indicates at least one first frequency band which the first antenna is able to receive, and the second information indicates at least one second frequency band which the second antenna is able to receive, and wherein the controller is configured to control to transmit the UE management information comprising the first information and the second information to the base station so that the base station determines beam training timing for each of the first antenna and the second antenna based on the first information and the second information.

2. The electronic device of claim 1, wherein the at least one first frequency band is a frequency band which only the first antenna among the first and second antennas is able to receive, and the at least one second frequency band is a frequency band which only the second antenna among the first and second antennas is able to receive.

3. The electronic device of claim 1, wherein the storage comprises an index mapping table includes:

a first index indicating that each frequency band is received by which antenna from among the first antenna and the second antenna, a second index indicating that each of the first antenna and the second antenna receives which frequency band.

4. The electronic device of claim 1, wherein each of the at least first frequency band and the at least second frequency band corresponds to a frequency of 450 MHz to 6,000 MHz and a frequency of 30 GHz to 100 GHz.

5. The electronic device of claim 1, wherein the common oscillator is configured to control the first antenna and the second antenna such that a phase and an amplitude of a signal transmitted or received by the first antenna is changed to be the same as a phase and an amplitude of a signal transmitted or received by the second antenna.

6. A base station comprising:

a communication interface configured to receive user equipment (UE) management information from an electronic device comprising a first antenna and a second antenna; and a controller configured to perform resource allocation based on the received UE management information, wherein the UE management information includes first information corresponding to the first antenna and second information corresponding to the second antenna, and wherein the first information indicates at least one first frequency band which the first antenna is able to receive, and the second information indicates at least one second frequency band which the second antenna is able to receive, and wherein the controller is further configured to determine beam training timing for each of the first antenna and the second antenna based on the first information and the second information.

7. The base station of claim 6, wherein the controller is configured to determine whether there are two or more frequency bands, commonly covered by both the first antenna and the second antenna, based on the received UE management information, wherein the first antenna and the second antenna of the electronic device are controlled by a common oscillator.

8. The base station of claim 7, wherein the controller is further configured to determine whether a first subcarrier interval of the at least one first frequency band and a second subcarrier interval of the at least one second frequency band is same, in response to determining that there are two or more frequency bands commonly covered by both the first antenna and the second antenna.

9. The base station of claim 8, wherein the controller is further configured to allocate resources such that beam training of the at least one first frequency band and the at least one second frequency band is performed during same time, in response to determining that the first subcarrier interval and the second subcarrier interval is same.

10. The base station of claim 8, wherein the controller is further configured to allocate resources such that beam training of the at least one first frequency band and the at least one second frequency band is performed during time corresponding to a longest symbol length among symbol lengths among the at least one first frequency band and the at least one second frequency band, in response to determining that the first subcarrier interval and the second subcarrier interval are different.

11. The base station of claim 6, wherein the controller is further configured to allocate resources such that beam training of the at least one first frequency band and the at least one second frequency band is performed at different symbol timings in response to determining that the first antenna and the second antenna are controlled independently.

12. A wireless communication system comprising:

an electronic device comprising a communication interface comprising a first antenna and a second antenna, a storage configured to store user equipment (UE) management information comprising first information corresponding to the first antenna, and second information corresponding to the second antenna, and a controller configured to control to transmit the UE management information to a base station; and the base station configured to perform resource allocation on the electronic device based on the UE management information, wherein the first antenna and the second antenna are controlled by a common oscillator, wherein the first information indicates at least one first frequency band which the first antenna is able to receive, and the second information indicates at least one second frequency band which the second antenna is able to receive, and wherein the controller is further configured to determine beam training timing for each of the first antenna and the second antenna based on the first information and the second information.

13. The wireless communication system of claim 12, wherein the at least one first frequency band is a frequency band which only the first antenna among the first and second antennas is able to receive, and the at least one second frequency band is a frequency band which only the second antenna among the first and second antennas is able to receive.

14. The wireless communication system of claim 12, wherein the base station is configured to determine whether a first subcarrier interval of the at least one first frequency band and a second subcarrier interval of the at least one second frequency band is same, in response to determining that there are two or more frequency bands commonly covered by both the first antenna and the second antenna.

15. The wireless communication system of claim 14, wherein the base station is further configured to allocate resources such that beam training of the at least one first frequency band and the at least one second frequency band is performed during same time, in response to determining that the first subcarrier interval and the second subcarrier interval is same.

16. The wireless communication system of claim 15, wherein the base station is further configured to allocate resources such that beam training of the at least one first frequency band and the at least one second frequency band is performed during time corresponding to a longest symbol length among symbol lengths among the at least one first frequency band and the at least one second frequency band, in response to determining that the first subcarrier interval and the second subcarrier interval are different.

17. The wireless communication system of claim 14, wherein the base station is further configured to allocate resources such that beam training of the at least one first frequency band and the at least one second frequency band is performed at different symbol timings in response to determining that the first antenna and the second antenna are controlled independently.

* * * * *